United States Patent
Akita et al.

(10) Patent No.: US 8,290,209 B2
(45) Date of Patent: Oct. 16, 2012

(54) MOBILE OBJECT RECOGNIZING DEVICE, MOBILE OBJECT RECOGNIZING METHOD, AND COMPUTER PROGRAM THEREOF

(75) Inventors: Tokihiko Akita, Nagoya (JP); Keita Hayashi, Kaizu-gun (JP)

(73) Assignee: Aisin Seiki Kabushiki Kaisha, Kariya-Shi (JP)

( * ) Notice: Subject to any disclaimer, the term of this patent is extended or adjusted under 35 U.S.C. 154(b) by 838 days.

(21) Appl. No.: 12/442,286

(22) PCT Filed: Oct. 4, 2007

(86) PCT No.: PCT/JP2007/069463
§ 371 (c)(1),
(2), (4) Date: Mar. 20, 2009

(87) PCT Pub. No.: WO2008/044592
PCT Pub. Date: Apr. 17, 2008

(65) Prior Publication Data
US 2009/0252377 A1   Oct. 8, 2009

(30) Foreign Application Priority Data
Oct. 6, 2006 (JP) ................... 2006-275387

(51) Int. Cl.
*G06K 9/00* (2006.01)
(52) U.S. Cl. ......... 382/103; 382/104; 382/106; 382/107
(58) Field of Classification Search ........... 382/103, 382/104, 106, 107
See application file for complete search history.

(56) References Cited

U.S. PATENT DOCUMENTS
5,265,172 A   11/1993   Markandey et al.
(Continued)

FOREIGN PATENT DOCUMENTS
EP   0 390 050 A2   3/1990
(Continued)

OTHER PUBLICATIONS
Machine Translation of JP 11-211738.*
(Continued)

*Primary Examiner* — Jason M Repko
*Assistant Examiner* — Katrina Fujita
(74) *Attorney, Agent, or Firm* — Sughrue Mion, PLLC

(57) ABSTRACT

A mobile object recognizing device comprises a camera (2) for taking time-series images, a feature point extracting unit (23) for extracting the feature points of the individual time-series images taken by the camera (2), an optical flow creating unit (24) for comparing the feature points of the time-series images between different images, to create an optical flow joining the feature points having the same pattern, and a grouping operation unit (25) for selecting that optical flow as one belonging to one mobile object, the prolonged line of which intersects with one vanishing point within a predetermined error range and in which the external ratio of a segment joining the other end point and the vanishing point with one end point of the optical flow being the externally dividing point in the extension of the optical flow. The mobile object recognizing device may further comprise an image correcting unit (22) for correcting the image taken by the camera (2), into a transparent diagram in accordance with the characteristics of the lens of the camera (2).

9 Claims, 9 Drawing Sheets

U.S. PATENT DOCUMENTS

| | | |
|---|---|---|
| 5,307,170 A | 4/1994 | Itsumi et al. |
| 6,049,619 A * | 4/2000 | Anandan et al. ............. 382/107 |
| 6,466,684 B1 * | 10/2002 | Sasaki et al. ................. 382/104 |
| 6,480,615 B1 | 11/2002 | Sun et al. |
| 6,534,884 B2 | 3/2003 | Marcus et al. |
| 6,810,132 B1 | 10/2004 | Umezaki et al. |
| 6,831,591 B2 * | 12/2004 | Horibe ........................... 342/52 |
| 2004/0062420 A1 | 4/2004 | Rohaly |

FOREIGN PATENT DOCUMENTS

| | | |
|---|---|---|
| EP | 0 390 050 A2 | 10/1990 |
| JP | 05-091513 A | 4/1993 |
| JP | 06-130076 A | 5/1994 |
| JP | 06-282655 A | 10/1994 |
| JP | 09-086314 A | 3/1997 |
| JP | 11-211738 A | 8/1999 |
| JP | 2001-216519 A | 8/2001 |
| JP | 2002-099906 A | 4/2002 |
| JP | 2003-306102 A | 10/2003 |
| WO | 2005/081178 A1 | 9/2005 |

OTHER PUBLICATIONS

Extended European Search Report issued in European Application No. 07829201.8 dated Apr. 1, 2011.

* cited by examiner

IMAGE-TAKING RANGE

F I G. 8
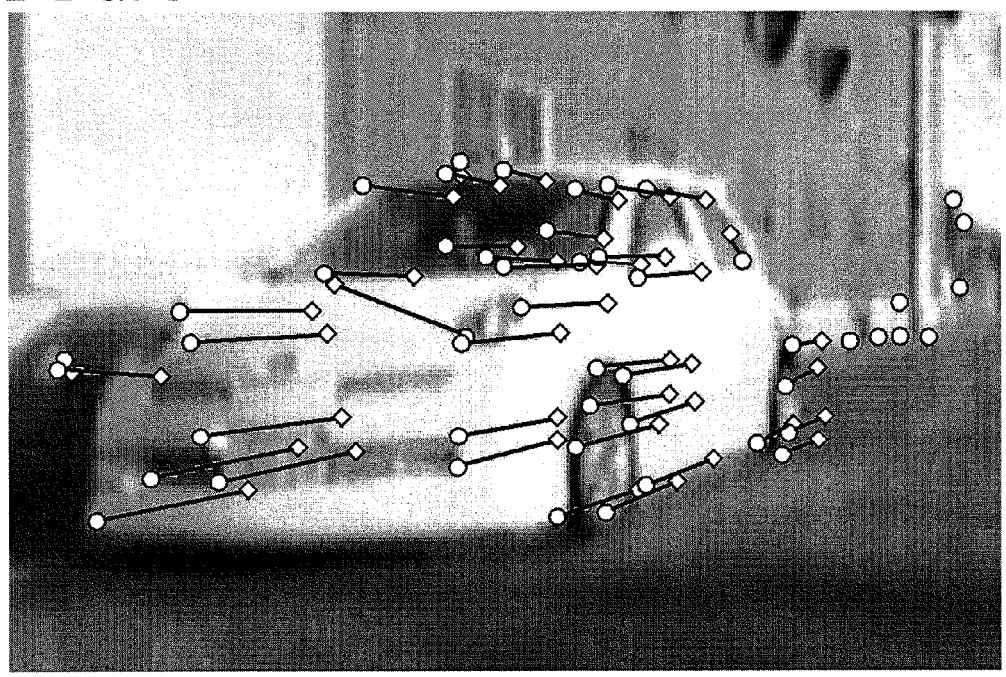
F I G. 9
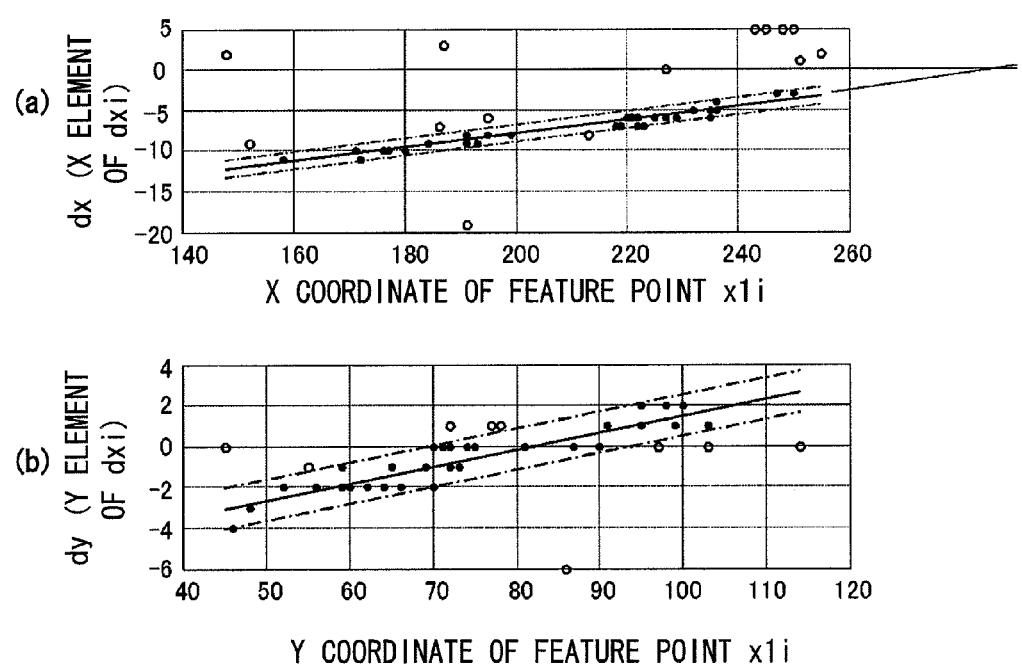

F I G. 10
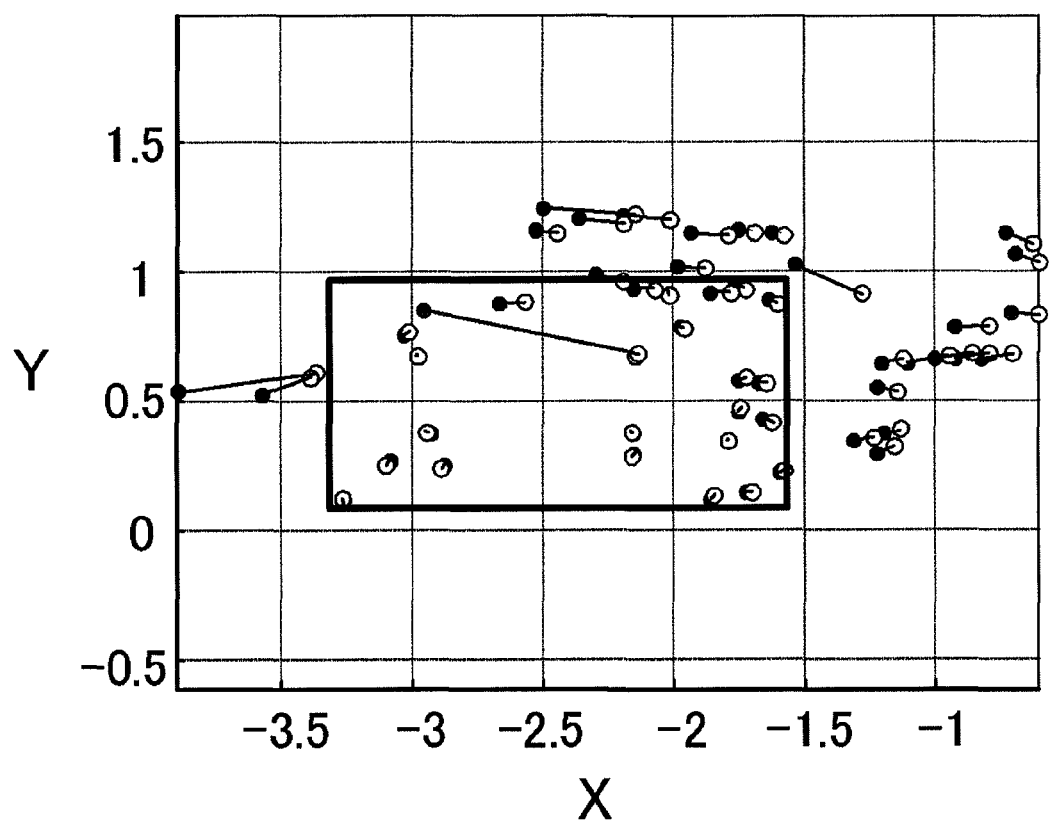

F I G. 11
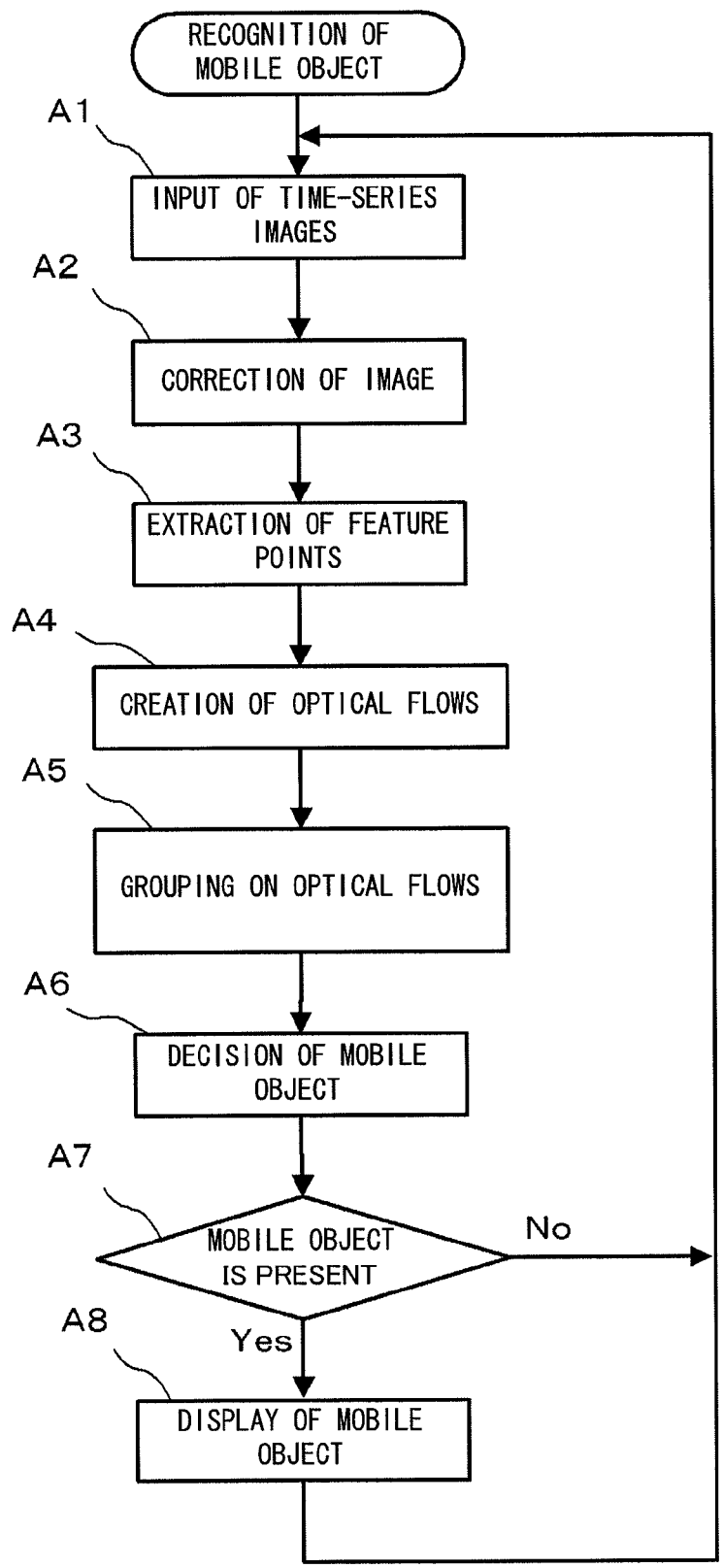

MOBILE OBJECT RECOGNIZING DEVICE, MOBILE OBJECT RECOGNIZING METHOD, AND COMPUTER PROGRAM THEREOF

TECHNICAL FIELD

The present invention relates to a mobile object recognizing device, a mobile object recognizing method and a computer program thereof, which recognize a mobile object by use of an image.

BACKGROUND ART

In recent years, for safer driving, technologies for detecting a mobile object approaching a vehicle, in particular, other vehicle or the like approaching from behind the vehicle in a traveling direction, are suggested for the purpose of notifying a driver that the other vehicle is approaching.

For example, according to a technology of Patent Document 1, a vehicle running diagonally behind is detected based on whether or not an optical flow derived from a taken image conforms to an optical flow corresponding to a traveling speed of an own vehicle sensed by a speed sensor.

Patent Document 2 discloses a technology for recognizing other vehicle even when driving in dim conditions. According to the technology of Patent Document 2, in terms of images of behind and/or side of an own vehicle, a movement of a point in a diverging direction thereof from a focus of expansion is detected as an optical flow between two images preceding and succeeding each other by a predetermined period of time. Then, a position of the focus of expansion of the optical flow is changed in accordance with an amount of movement calculated based on a traveling direction information and a traveling distance information of the own vehicle.

Patent Document 3 discloses a technology for recognizing a mobile object in surroundings of an own vehicle based on an obtained optical flow even when the vehicle is not traveling in a straight manner. According to the technology of Patent Document 3, the optical flow obtained from a time-series image is classified in multiple groups of the optical flow having continuous changes. The optical flow is corrected based on a moving direction of the own vehicle assumed from a speed sensor and a yaw rate sensor. Then, the mobile object is extracted from the group of the corrected optical flow and a relative speed is calculated.
Patent Document 1: JPH6-130076(A)
Patent Document 2: JPH9-86314(A)
Patent Document 3: JPH6-282655(A)

DISCLOSURE OF INVENTION

According to known technologies, a vehicle approaching from behind and/or side is recognized by use of an image, where a basic technology involves extracting an optical flow from two time-series images and then detecting the approaching vehicle according to the optical flows.

According to a technology of Patent Document 1, a mobile object is detected based on a difference between an optical flow and a traveling speed of an own vehicle. On an image surface, the traveling speed of the own vehicle corresponds to the optical flow of a background. The optical flow that differs from the optical flow of the background is recognized as the optical flow of a mobile object. However, actions are not taken for each mobile object because the optical flow is not grouped.

According to a technology of Patent Document 2, a mobile object is detected from a direction of an optical flow relative to the focus of expansion. However, the optical flow is an apparent flow (optical flow on an image surface) and is not grouped.

According to a technology of Patent Document 3, an optical flow having a continuous change is classified into multiple groups. However, grouping based only on the continuity of the change is not always possible because a geometric size of the optical flow is different depending on its position on an image. When a wide-angle lens is employed, in particular, it is difficult to group even the optical flows belonging to one mobile object because they diverge greatly when approaching, and thus a direction and the size thereof become different, resulting in wrong grouping.

In light of the above, it is an object of the present invention to provide a mobile object recognizing device that correctly detects a mobile object from an image.

To achieve the above-described object, a mobile object recognizing device according to a first aspect of the present invention includes an image-taking means taking images in time series, a feature point extracting means extracting a feature point of each image taken in time series by the image-taking means, an optical flow creating means creating an optical flow corresponding to a vector formed by connecting one feature point in one image with another feature point in another image, the connected two feature points being identified to have the same pattern by comparing the feature points with one another between different images, and a grouping means selecting and grouping the optical flows created by the optical flow creating means which belong to a particular mobile object, wherein each of the selected optical flows is defined as having an extended line intersecting at one focus of expansion within a predetermined error range, and having an equal external ratio of each line segment connecting one of the end points of the optical flow and the focus of expansion within a predetermined error range when the other one of the end points of the optical flow is an externally dividing point on the extended line.

Preferably, the mobile object recognizing device according to the first aspect of the present invention is characterized by including an image correcting means correcting the image taken by the image-taking means in accordance with characteristics of a lens of the image-taking means to obtain a perspective image, wherein the feature point extracting means extracts the feature point of the image corrected by the image correcting means.

Further, the mobile object recognizing device according to the first aspect of the present invention may include a distance calculating means calculating a distance from the image-taking means to the mobile object by using the optical flows grouped by the grouping means.

The mobile object recognizing device according to a second aspect of the present invention is characterized by including the image-taking means taking the images in time series, the feature point extracting means extracting the feature point of each image taken in time series by the image-taking means, the optical flow creating means creating the optical flow corresponding to the vector formed by connecting one feature point in one image with another feature point in another image, the connected two feature points being identified to have the same pattern by comparing the feature points with one another between the different images, a distance detecting means detecting a distance from the image-taking means to at least one feature point extracted by the feature point extracting means, a displacement calculating means calculating a displacement of the feature point in each optical flow based on the distance to the feature point detected by the distance detecting means and the optical flow including the feature point, and an equal displacement point selecting means selecting the feature points having an equal displacement calculated by the displacement calculating means as the feature points belonging to one mobile object.

Preferably, the mobile object recognizing device according to the second aspect of the present invention is characterized by including the image correcting means correcting the image taken by the image-taking means in accordance with the characteristics of the lens of the image-taking means to obtain the perspective image, wherein the feature point extracting means extracts the feature point of the image corrected by the image correcting means.

Further, the mobile object recognizing device according to the second aspect of the present invention may include the grouping means selecting and grouping the optical flows created by the optical flow creating means which belong to the particular mobile object, wherein each of the selected optical flows is defined as having the extended line intersecting at one focus of expansion within the predetermined error range, and having the equal external ratio of each line segment connecting one of the end points of the optical flow and the focus of expansion within the predetermined error range when the other one of the end points of the optical flow is the externally dividing point on the extended line, and the distance calculating means calculating the distance from the image-taking means to the mobile object by using the optical flows grouped by the grouping means, wherein the distance calculated by the distance calculating means may be the distance to the feature point.

The distance detecting means may be structured so as to measure the distance to the mobile object by a physical means employing light, an electromagnetic wave, a sound wave or the like.

The mobile object recognizing device according to a third aspect of the present invention is characterized by including an image-taking step inputting the images in time series, a feature point extracting step extracting the feature point of each image in time series inputted in the image-taking step, an optical flow creating step creating the optical flow corresponding to the vector formed by connecting one feature point in one image with another feature point in another image, the connected two feature points being identified to have the same pattern by comparing the feature points with one another between the different images, and a grouping step selecting and grouping the optical flows, wherein each of the selected optical flows is defined as having the extended line intersecting at one focus of expansion within the predetermined error range, and having the equal external ratio of each line segment connecting one of the end points of the optical flow and the focus of expansion within the predetermined error range when the other one of the end points of the optical flow is the externally dividing point on the extended line.

Preferably, the mobile object recognizing device according to the third aspect of the present invention is characterized by including an image correcting step correcting the image inputted in the image-taking step in accordance with the characteristics of the lens of the image-taking means to obtain the perspective image, wherein the feature point extracting step extracts the feature point of the image corrected in the image correcting step.

The mobile object recognizing device according to a forth aspect of the present invention is characterized by causing a computer to function as the image-inputting means inputting the images in time series from the image-taking means, the feature point extracting means extracting the feature points of each image taken in time series by the image-inputting means, the optical flow creating means creating the optical flow corresponding to the vector formed by connecting one feature point in one image with another feature point in another image, the connected two feature points being identified to change positions thereof on the image and have the same pattern by comparing the feature points with one another between the different images, and the grouping means selecting and grouping the optical flows created by the optical flow creating means which belong to the particular mobile object, wherein each of the selected optical flows is defined as having the extended line intersecting at one focus of expansion within the predetermined error range, and having the equal external ratio of each line segment connecting one of the end points of the optical flow and the focus of expansion within the predetermined error range when the other one of the end points of the optical flow is the externally dividing point on the extended line.

According to the mobile object recognizing device of the present invention, the mobile object is detected by correctly grouping the optical flows of the feature points extracted from the images in time series.

BRIEF DESCRIPTION OF DRAWINGS

FIG. 8 shows an example of the optical flow;

FIG. 9 shows graphs plotted with X elements (a) and Y elements (b) of a linear equation where an external ratio of the optical flow and a focus of expansion is transformed;

FIG. 10 a diagram on which world coordinates of the optical flows are projected on an XY plane;

FIG. 11 is a flow chart showing an example of an operation of recognition of the mobile object;

Figure 1:
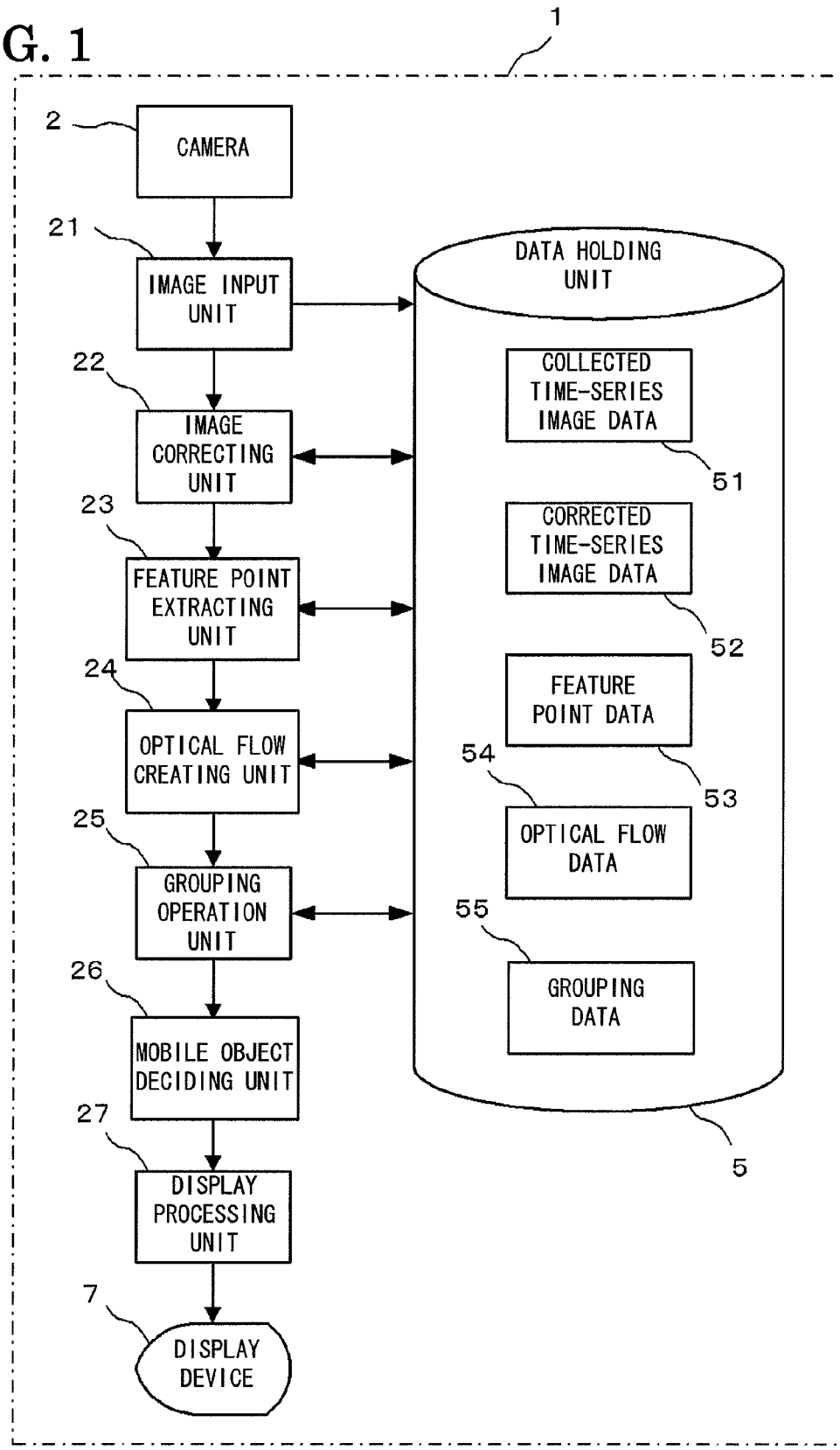
FIG. 1 is a block diagram showing a theoretical structure of a mobile object recognizing device according to a first embodiment of the present invention.

EXPLANATION OF REFERENCE NUMERALS 1 mobile object recognizing device
2 camera (image-taking means)
3 distance measuring device (distance detecting means)
5 data holding unit
7 display device
10 internal bus
11 control unit (feature point extracting means, optical flow creating means, grouping means, displacement calculating means, equal displacement point selecting means, image correcting means)
12 main memory unit
13 external memory unit
14 operating unit 15 screen display unit
16 transmitting and receiving unit
21 image input unit
22 image correcting unit (image correcting means)
23 feature point extracting unit (feature point extracting means)
24 optical flow creating unit (optical flow creating means)
25 grouping operation unit (grouping means)
26 mobile object deciding unit
27 display processing unit
28 data acquisition unit
29 equal displacement point extracting and processing unit (displacement calculating means, equal displacement point selecting means)
51 collected time-series image data
52 corrected time-series image data
53 feature point data
54 optical flow data
55 grouping data
56 distance data

MODE FOR CARRYING OUT THE INVENTION

Embodiments of the present invention will be described hereunder with reference to the accompanying drawing figures. In the drawing figures, the same reference numerals designate the same or corresponding portions or procedures, and therefore, description thereof is not repeated. As an embodiment of a mobile object recognizing device according to the present invention, a mobile object recognizing device of a vehicle will be described hereunder with reference to the drawing figures.

(First embodiment) FIG. 1 is a block diagram showing a theoretical structure of the mobile object recognizing device according to a first embodiment of the present invention. The mobile object recognizing device 1 is constituted by a camera 2, an image input unit 21, an image correcting unit 22, a feature point extracting unit 23, an optical flow creating unit 24, a grouping operation unit 25, a data holding unit 5, a mobile object deciding unit 26, a display processing unit 27, a display device 7 and so forth. Collected time-series image data 51, corrected time-series image data 52, feature point data 53, optical flow data 54 and grouping data 55 are stored and held in the data holding unit 5. The mobile object recognizing device 1 recognizes whether or not there are any mobile objects in surroundings of an own vehicle and the type of mobile object. In particular, the mobile object recognizing device 1 detects other vehicle or the like approaching from behind the own vehicle in a traveling direction of the own vehicle.

Figure 3:
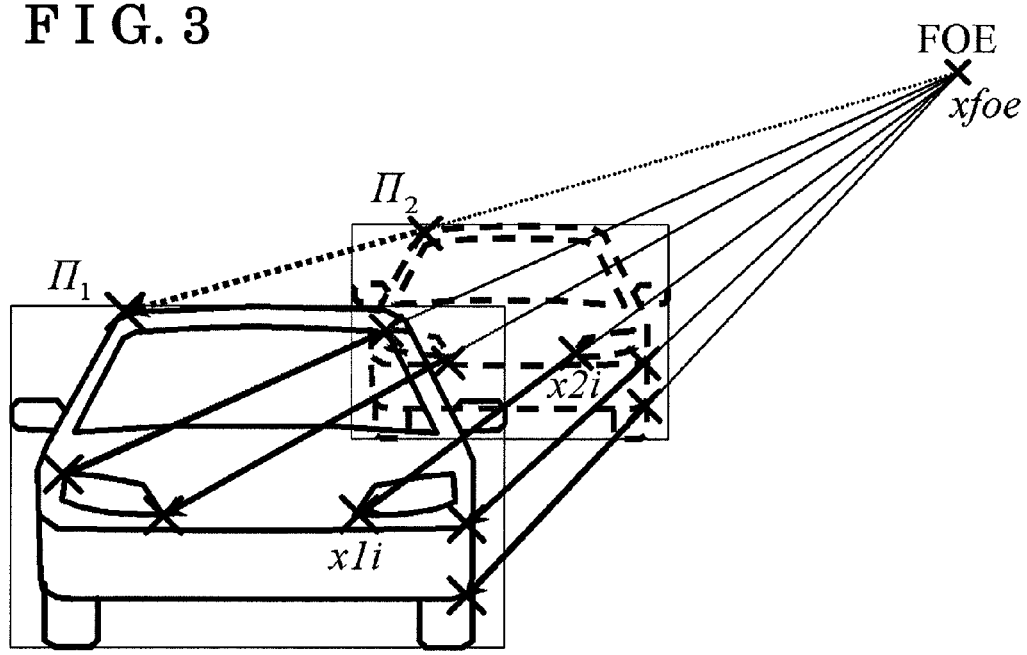
FIG. 3 is a diagram describing optical flows.

Here, an optical flow and a grouping method thereof will be described. FIG. 3 is a diagram describing the optical flow. FIG. 3 schematically shows a situation where the other vehicle is approaching, as the mobile object, toward the camera 2. A feature point in a current image II$_1$ is x1$i$ (I=1 ... n). The feature point that is in a past image II$_2$ and corresponds to x1$i$ is x2$i$. When the feature point x2$i$ of the past image II$_2$ is superimposed on the current image II$_1$, a vector from x2$i$ to x1$i$ is called the optical flow.

In case that the image is a perspective image, when the optical flow of the feature point of an object moving parallel to a coordinate system fixed to the camera 2 (camera coordinate system), i.e., moving straight toward the camera coordinate, is extended, the extended optical flow intersects at a point on the image (FIG. 3). When a straight line is drawn from each feature point, the straight lines are parallel to each other with respect to the camera coordinate, therefore the straight lines intersect at the point when seen in the perspective method. This point is referred to as a focus of expansion (FOE). If different individual objects are moving but not in a parallel manner to each other, the optical flows of these objects intersect at the different focuses of expansion.

For the optical flows of one object moving parallel to the camera coordinate system, the following relationship is established when the image is the perspective image:

$$\frac{x1i - x2i}{x1i - xfoe} = C \qquad \text{[Mathematical expression 1]}$$

Here, x1$i$ is a coordinate on the image corresponding to the feature point on the current image II1, x2$i$ is a coordinate on the image corresponding to the feature point on the past image II2, xfoe is a coordinate on the image corresponding to the focus of expansion, and C is a constant.

That is, when the feature point x1$i$ of the current image, which corresponds to one end point of the optical flow, is an externally dividing point, an external ratio of a line segment connecting the feature point x2$i$ of the past image (the other end point of the optical flow) and the focus of expansion xfoe is constant within one object parallelly moving. Therefore, the optical flows which intersect at one focus of expansion and whose external ratios are equal to one another are grouped as the optical flows belonging to the one object. Instead of the above mentioned external ratio, for example, when the focus of expansion is defined as the externally dividing point, the external ratios of the optical flows within one object are constant.

A function of each portion of the mobile object recognizing device 1 is described in FIG. 1. The camera 2 takes the image and transforms the image into digital image data. Images in time series are inputted from the camera 2 to the image input unit 21 at constant time intervals and saved in the data holding unit 5 as the collected time-series image data 51.

Figure 4:
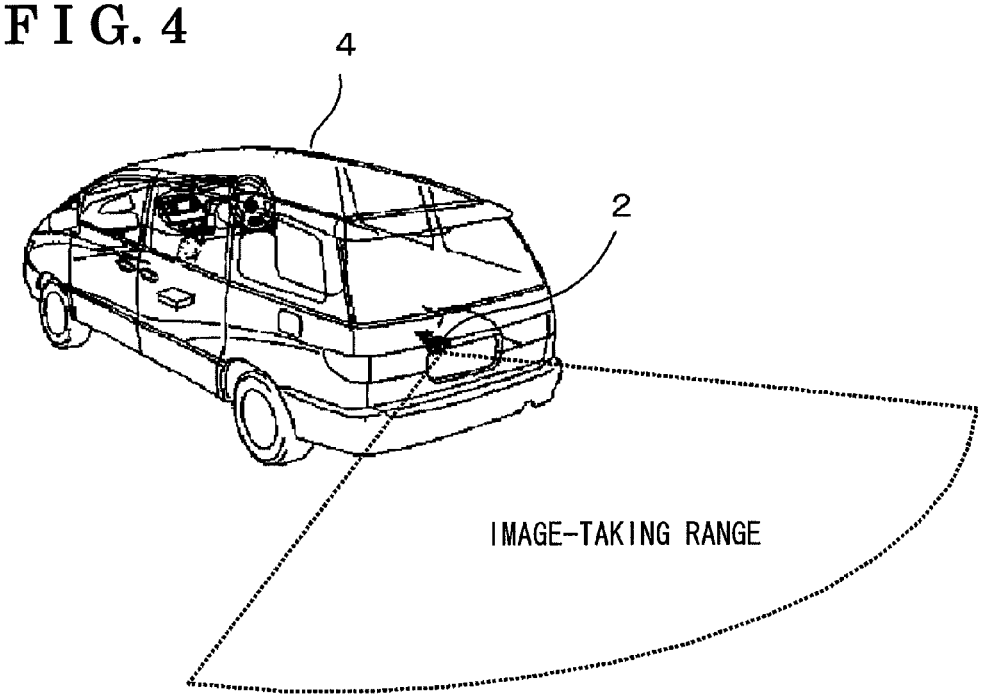
FIG. 4 is a diagram showing an example of an installation position of a camera on a vehicle.

As the camera 2 taking the image of the mobile object, the camera 2 for a rear monitor of a vehicle 4 as shown in FIG. 4 may be utilized. By utilizing the camera 2 for the rear monitor, there is no need to newly provide the camera 2, and thus the mobile object recognizing device 1 is constituted at a low cost.

Since a rear monitor camera of a parking assist system employs a wide-angle lens, the periphery of the image is distorted and a limit of resolution is low in a far field of the image. In addition, the rear monitor camera is mounted on a low position. These conditions are adverse to processing the image in an actual world coordinate system, thereby making it difficult to recognize an approaching mobile object.

Hence, distortion of the taken image is corrected. The image correcting unit 22 shown in FIG. 1 corrects the distortion of the taken image in accordance with characteristics of the lens and transforms into the perspective image. The image correcting unit 22 saves the corrected image in the data holding unit 5 as the corrected time-series image data.

A relationship between a coordinate (x, y) on the perspective image and a corresponding coordinate (x', y') on a pre-corrected image is expressed by the following mathematical expression:

$$r = \sqrt{(x - x_0)^2 + (y - y_0)^2}, \qquad \text{[Mathematical expression 2]}$$
$$r' = f_n(r)$$
$$x' = r'/r \cdot (x - x_0) + x'_0,$$
$$y' = r'/r \cdot (y - y_0) + y'_0$$

Here, (x0, y0) is a central coordinate of the distortion of the corrected image, (x'0, y'0) is a central coordinate of the pre-corrected image. The fn(r) is a distortion characteristics function of the camera lens.

Further, the image may be transformed into an image in case that the camera is oriented horizontally. A transformation for changing the orientation of the camera 2 is expressed by the following mathematical expression when a coordinate before the transformation is (x', y') and a coordinate after the transformation is (x', y').

[Mathematical expression 3]

$$x'' = \frac{h_{11}(x' - x'_0) + h_{12}(y' - y'_0) + h_{13}z + h_{14}}{h_{31}(x' - x'_0) + h_{32}(y' - y'_0) + h_{33}z + h_{34}} \cdot \frac{z}{\cos\beta} + x''_0,$$

$$y'' = \frac{h_{21}(x' - x'_0) + h_{22}(y' - y'_0) + h_{23}z + h_{24}}{h_{31}(x' - x'_0) + h_{32}(y' - y'_0) + h_{33}z + h_{34}} \cdot \frac{z}{\cos\beta} + y''_0 - e0$$

Here, $\beta$ expresses a tilt angle of the camera 2, z expresses a scale factor, e0 expresses a distance between the focus of expansion and the center of the image before the image is transformed, and H=[hij] expresses an image transformation matrix.

Figure 5:
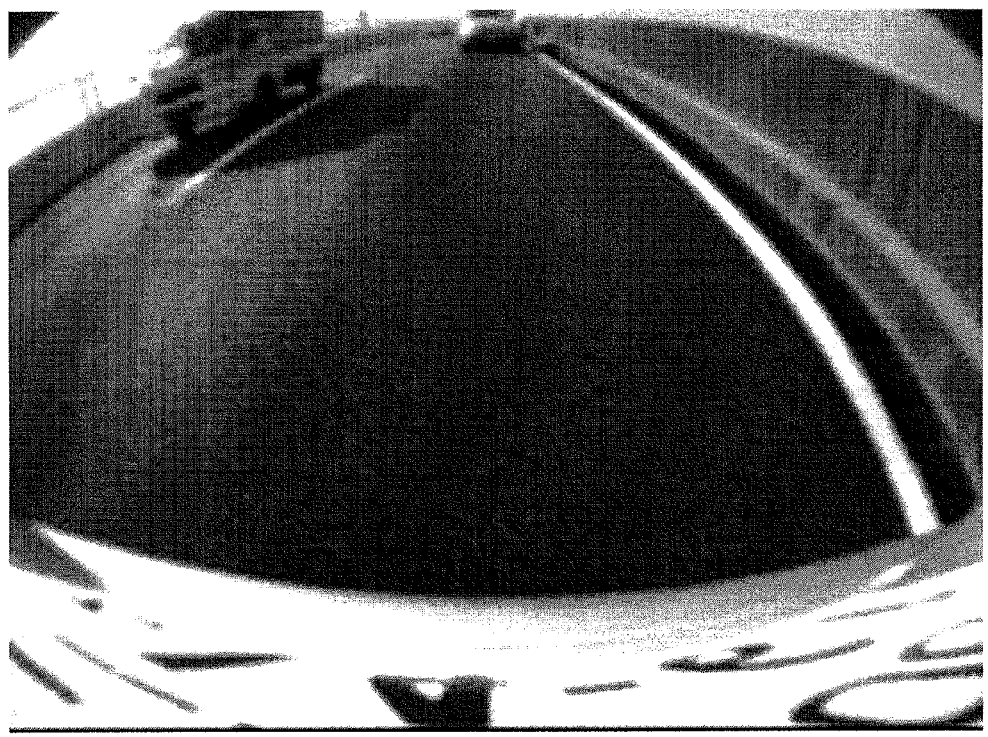
FIG. 5 is an example of an image taken by a rear monitor camera having a wide-range lens.
Figure 6:
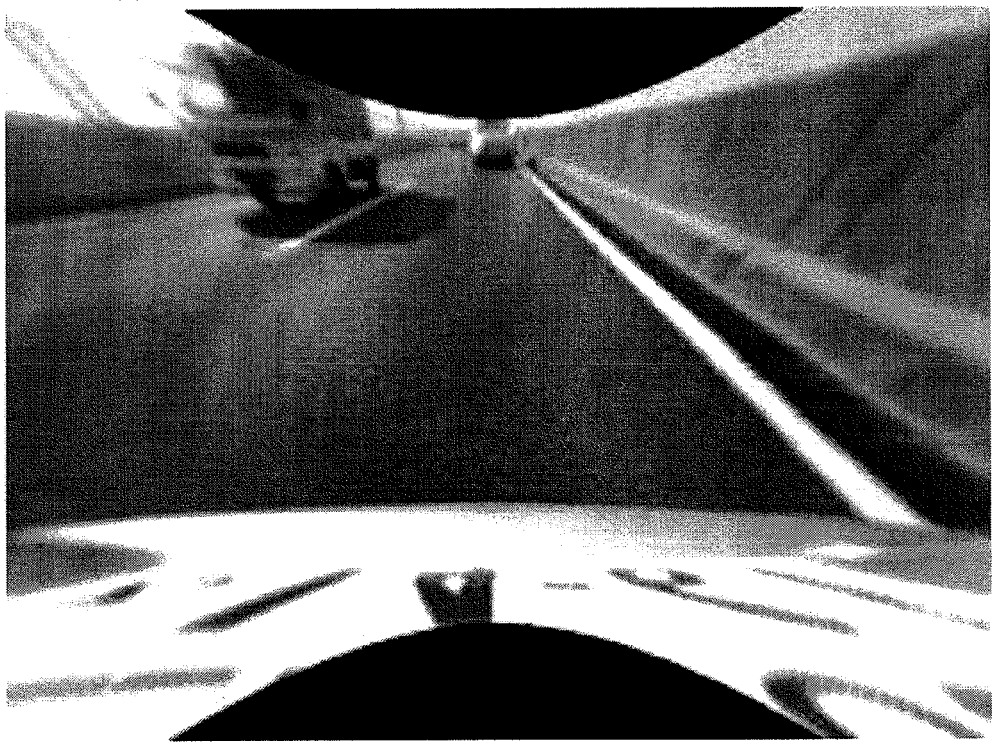
FIG. 6 is an example of an image where a distortion of the image shown in FIG. 5 is corrected.
Figure 7:
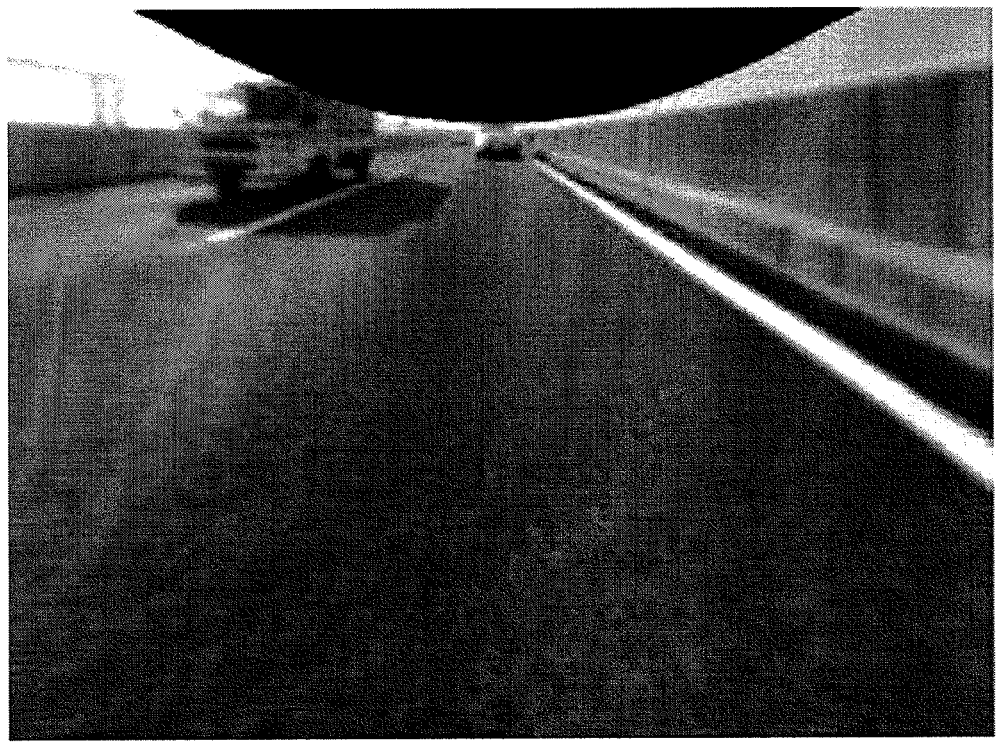
FIG. 7 shows an image obtained by normalizing the image shown in FIG. 6.

FIG. 5 is an example of the image taken by the rear monitor camera having the wide-range lens. FIG. 6 is an example of the image where the distortion of the image shown in FIG. 5 is corrected. In FIG. 5, white lines on a road surface are curved, while the white lines on a straight road are corrected to be straight in the corrected image of FIG. 6. FIG. 7 shows the image obtained by normalizing the image shown in FIG. 6. The normalized image is obtained by performing the transformation into the image taken by the camera 2 that is horizontally oriented. In FIG. 6, vertical lines converge at one point located in a lower portion, while the vertical lines are parallel to each other in FIG. 7 where the orientation of the camera 2 is corrected to be horizontal.

Next, the feature points are extracted from the corrected time-series image data for conducting comparison between the images. The feature point extracting unit 23 extracts the feature points from the corrected time-series image data 52 and save the feature points in the data holding unit 5 as the feature point data 53. The optical flow creating unit 24 compares the feature points between the images and creates the optical flow from the vector connecting the feature points having high correlation with regards to their pattern. The optical flow creating unit 24 saves the created optical flow in the data holding unit 5 as the optical flow data 54. Methods for extracting the feature points and creating the optical flow will be described hereunder.

A moving vector is calculated in order to detect an approaching object in a search area obtained by way of a background subtraction. Although there are several conceivable methods for calculating the moving vector, template matching may be applied, which is relatively resistant to environmental changes. To perform the template matching, it is important to select an image block that is easy to be tracked. For example, a calculation method for a KLT feature point may be applied.

When a moment matrix having an intensive gradient $\nabla I = [Ix, Iy]^T$ is as follows, $$M(x, y) = \begin{bmatrix} Ix^2 & IxIy \\ IyIx & Iy^2 \end{bmatrix}$$

[Mathematical expression 4]

the following mathematical expression is established.

$$Ix = \frac{\partial I}{\partial x}, Iy = \frac{\partial I}{\partial y}$$

[Mathematical expression 5]

When a KLT feature quantity is $\lambda 2/\lambda 1$ (condition number of matrix M (x, y)=eigenvalue ratio) or the KLT feature quantity is min ($\lambda 2, \lambda 1$), the KLT calculation method is represented by the following mathematical expression:

[Mathematical expression 6]

$$\lambda_1 = \frac{Ix^2 + Iy^2}{2} + \sqrt{\frac{(Ix^2 - Iy^2)^2}{4} + (IxIy)^2}$$

$$\lambda_2 = \frac{Ix^2 + Iy^2}{2} - \sqrt{\frac{(Ix^2 - Iy^2)^2}{4} + (IxIy)^2}$$

A template is set around the obtained feature points, and an area having high correlations with the template is searched from the chronologically newer image. A relevant motion vector is obtained as the moving vector (optical flow). As a method of the template matching, a method of the normalized cross-correlation (NCC) may be applied. A degree of similarity (RNCC) of the normalized cross-correlation is obtained by the following mathematical expression:

[Mathematical expression 7]

$$R_{NCC} = \frac{\left( \sum_{j=1}^{N-1} \sum_{i=1}^{M-1} ((I(i, j) - \bar{I})(T(i, j) - \bar{T})) \right)}{\left( \sqrt{\sum_{j=1}^{N-1} \sum_{i=1}^{M-1} (I(i, j) - \bar{I})^2 \times \sum_{j=1}^{N-1} \sum_{i=1}^{M-1} (T(i, j) - \bar{T})^2} \right)}$$

Here, I is an intensity vector in an area of N row by M column and T is the intensity vector in a template area of N row by M column. Bars above the variables represent average values in each area respectively.

Since a full search of the area requires a large amount of calculation, a limitation of an amount of movement of the mobile object is assumed depending on the situation and only the limited area is searched to reduce a calculation load. For example, the search is not performed in any other directions than an approaching direction. Alternatively, the search is not performed in an area where a physical possibility is assumed to be low according to an amount of movement in the past, and so forth. Still alternatively, since the object that is close to the camera 2 shows a large amount of movement, a hierarchization is performed, the search area is narrowed by conducting the matching in a higher hierarchical level, and then a detailed search is performed in order to reduce the amount of calculation.

FIG. 8 shows an example of the optical flow. Open rectangles represent the feature points in a previous frame and open circles represent points in an updated frame having high correlations with the feature points in the previous frame. Even though the optical flows belong to one mobile object, for example, the optical flow of a radiator grill and the optical flow of a rear wheel are different in their directions and lengths, and thus it is difficult to group them as the optical flows belonging to one mobile object.

Hence, as previously described, the optical flows which intersect at one focus of expansion and whose external ratios expressed in mathematical expression 1 are equal to one another are grouped as the optical flows belonging to one object. The grouping operation unit 25 groups the optical flow, for example, as follows.

The mathematical expression 1 includes two parameters (the focus of expansion and external ratio constant) and grouping conditions require each optical flow has the same parameters. Here, the mathematical expression 1 is transformed into a linear equation for two variables.

$$dxi = C \cdot x1i - C1 \qquad \text{[Mathematical expression 8]}$$

Here, $dxi = x1i - x2i$, and $C1 = C \cdot xfoe$.

When dxi and x1i are plotted on planes in terms of the x coordinate and the y coordinate respectively for each optical flow, FIG. 9 is obtained. FIG. 9 (a) shows x elements of dxi for the x coordinate of x1i. FIG. 9 (b) shows y elements of dxi for the y coordinate of x1i.

Among the points plotted as shown in FIG. 9, the points lying on a straight line allowing a certain error are grouped as the optical flows that belong to one and the same mobile object. Although there are various methods to judge whether or not the point is on the straight line, for example, the RANSAC (RANdom SAmple Consensus) may be applied. The RANSAC is an algorithm where any two points are selected and connected with a straight line, the number of points lying within the tolerance of the straight line is counted, and the straight line having the greatest number of points is selected. The points on the selected straight line with the tolerance are grouped as one group of the optical flows.

Aside from the points that have been classified as one group, in order to further group the optical flows belonging to another mobile object, the points lying on a straight line allowing the certain error are selected. By repeating this, multiple mobile objects are recognized.

The grouping operation unit 25 saves data of the grouped optical flows in the data holding unit 5 as the grouping data 55. The mobile object deciding unit 26 makes decisions on the mobile object based on the grouping data 55. For example, a size of the mobile object, a vehicle model and so forth are decided based on a placement of the feature points. Further, the grouping operation unit 26 calculates a distance to the mobile object.

Assuming that the lowest point of the optical flows is the road surface (the same plane as the one on which the own vehicle is positioned), the distance to the mobile object is calculated by using the following mathematical expression. Here, a distance Z is the direction cosine of a distance from the camera to the object with respect to an imaging direction. The imaging direction is a direction of an optical axis of the camera, which corresponds to a horizontal direction (parallel to the road surface) when the image is normalized in the horizontal direction. Hereinafter, the imaging direction corresponds to the horizontal direction (parallel to the road surface). A coordinate of the feature point on an image plane is (u, v), the world coordinate is (X, Y, Z) and a central coordinate of the image is (cu, cv). U=u−cu and V=v−cv.

[Mathematical expression 9]

$$Z = \frac{\left(\frac{f}{\delta v}r_{21} - Vr_{31}\right)\left(\frac{f}{\delta u}(t_1 - r_{12}h) - U(t_3 - r_{33}h)\right) - \left(\frac{f}{\delta u}r_{11} - Ur_{31}\right)\left(\frac{f}{\delta v}(t_2 - r_{22}h) - V(t_3 - r_{32}h)\right)}{\left(\frac{f}{\delta v}r_{21} - Vr_{31}\right)\left(-\frac{f}{\delta u}r_{13} + Ur_{33}\right) - \left(\frac{f}{\delta u}r_{11} - Ur_{31}\right)\left(-\frac{f}{\delta v}r_{23} - Vr_{33}\right)}$$

Here, f is a focal distance of the camera 2, δu and δv are physical intervals between pixels in a lateral direction and a longitudinal direction respectively, and h is a height of the camera from the road surface. R=[rij] is a rotating matrix with a coefficient of a projective transformation matrix and T=[tk]$^T$ is a parallel motion vector with the coefficient of the projective transformation matrix.

The display processing unit 27 displays decision results made by the mobile object deciding unit 26 on the display device 7. For example, a relationship between a position of a vehicle approaching from behind and the own vehicle is shown in a plan view. Further, the display on the display device 7 may include acoustic effects such as sound or chime.

Figure 2:
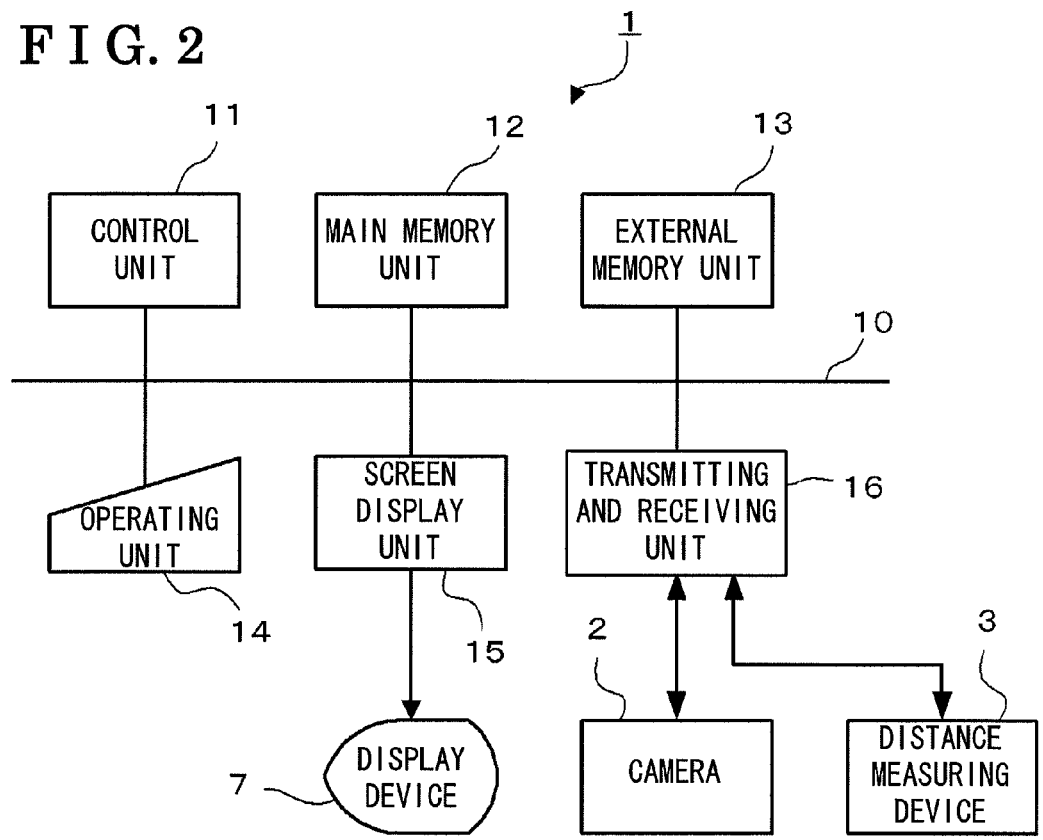
FIG. 2 is a block diagram illustrating an example of a physical structure of the mobile object recognizing device.

FIG. 2 is a block diagram illustrating a physical structure of the mobile object recognizing device 1. As shown in FIG. 2, the mobile object recognizing device 1 according to the present invention shown in FIG. 1 is constituted by hardware of a control unit 11, a main memory unit 12, an external memory unit 13, an operating unit 14, a screen display unit 15, a transmitting and receiving unit 16, the camera 2, a distance measuring device 3, and a display device 7. All of the control unit 11, the main memory unit 12, the external memory unit 13, the operating unit 14, the screen display unit 15, and the transmitting and receiving unit 16 are connected to the control unit 11 via an internal bus 10.

The control unit 11 is constituted by a CPU (Central Processing Unit) and so forth, and executes processing of the image input unit 21, the image correcting unit 22, the feature point extracting unit 23, the optical flow creating unit 24, the grouping operation unit 25, the mobile object deciding unit 26, and the display processing unit 27 in accordance with a program stored in the external memory unit 13. The image input unit 21, the image correcting unit 22, the feature point extracting unit 23, the optical flow creating unit 24, the grouping operation unit 25, the mobile object deciding unit 26, and the display processing unit 27 are realized by the control unit 11 and the program executed on the control unit 11.

The main memory unit 12 is constituted by a RAM (Random-Access Memory) and so forth, and is used as a working space of the control unit 11. The data holding unit 5 is stored and held, as a structure of a memory area, in a part of the main memory unit 12.

The external memory unit 13 is constituted by a nonvolatile memory including a flash memory, a hard disc, a DVD (Digital Versatile Disc), a DVD-RAM (Digital Versatile Disc Random-Access Memory), a DVD-RW (Digital Versatile Disc ReWritable) and stores in advance the program for causing the control unit 11 to execute the above-mentioned processing. In addition, the external memory unit 13 provides the control unit 11 with data of the program and stores data provided by the control unit 11 according to instructions of the control unit 11. For example, the time-series image data may be stored in the external memory unit 13.

The operating unit 14 is provided with pointing devices and so forth including a key switch, a jog dial, a keyboard, a mouse, and an interface device connecting them to the internal bus 10. Conditions for recognizing and deciding the mobile object, a command to start recognizing the mobile object and so forth are inputted via the operating unit 14, and then provided to the control unit 11.

The display device 7 is constituted by a CRT (Cathode Ray Tube), an LCD (Liquid Crystal Display) or the like, and displays the collected time-series image data 51, the corrected time-series image data 52, the decision results on the mobile object and so forth in response to the instruction of the control unit 11 according to the command inputted via the operating unit 14. The screen display unit 15 transforms the image data to be displayed on the display device 7 into a signal that actuates the display device 7.

The display device 7 may be provided with a speaker, a buzzer or the like. In that case, the screen display unit 15 causes the acoustic effects such as the sound or the chime to be outputted from the display device 7.

The camera 2, for example, transforms the image formed on the lens into an electric signal by use of a CCD or the like and outputs the image data that is digitized pixel-by-pixel. The distance measuring device 3 corresponds, for example, to a millimeter wave radar, a laser range finder, an ultrasonic distance meter or the like and outputs the distance to the mobile object as an electric signal. The distance measuring device 3 is not employed in the first embodiment. The distance measuring device 3 is employed to measure the distance to the object in a second embodiment mentioned below.

The transmitting and receiving unit 16 is constituted by a modem or a network terminator, and a serial interface or a LAN (Local Area Network) interface connected thereto. Time-series data is inputted to the control unit 11 from the camera 2 or the distance measuring device 3 via the transmitting and receiving unit 16.

Next, an operation of the mobile object recognizing device 1 will be described. As described above, the mobile object recognizing device 1 is operated by the control unit 11 in cooperation with the main memory unit 12, the external memory unit 13, the operating unit 14, the screen display unit 15, and the transmitting and receiving unit 16.

FIG. 11 is a flow chart showing an example of the operation of recognizing the mobile object. The images in time series are inputted to the control unit 11 from the camera 2 via the transmitting and receiving unit 16 (Step A1). Then, as previously described, the image is corrected in accordance with the characteristics of the lens of the camera 2 (Step A2). Further, the image may be normalized so as to be the image in the horizontal direction by correcting the tilt angle of the camera 2.

The control unit 11 extracts the feature points of the corrected image by, for example, an extraction method for the KLT feature point previously described (Step A3). The control unit 11 compares the extracted feature points between the images in time series and creates the optical flows by applying the template matching (Step A4).

Next, the optical flows are grouped (Step A5). As previously described, among the points plotted as shown in FIG. 9, the points on the straight line allowing the certain error are grouped as the optical flows that belong to one and the same mobile object. To judge whether or not the point is on the straight line, for example, the RANSAC is applied. Then, the mobile object is decided based on the patterns of the feature points belonging to the grouped optical flows (Step A6). Further, the distance to the mobile object may be calculated in a manner shown in the mathematical expression 9, assuming that the lowest point of the optical flows is the road surface (the same plane as the one on which the own vehicle is positioned).

When the mobile object is recognized (Yes in Step A7), the control unit 11 causes the information to be displayed on the display device 7 via the screen display unit 15 (Step A8). For example, the relationship between the position of the vehicle approaching from behind and that of the own vehicle is shown in the plan view. Alternatively, the display device 7 may notify a driver by means of the acoustic effects such as the sound or the chime. Then, the operation returns to the input of the images in time series (Step A1) and the recognition of the mobile object is repeated. When no mobile object is recognized (No in Step A7), no display takes place and the recognition of the mobile object is repeated (Step A1).

According to the mobile object recognizing device 1 of the present invention, the optical flows created from the series-image data are correctly grouped for each mobile object. As a result, the mobile object is correctly recognized. In addition, the image is corrected in accordance with the characteristics of the lens of the camera 2, thereby the optical flows created from the corrected image data are correctly grouped for each mobile object even when a rear camera employing the wide-range lens is used.

Figure 12:
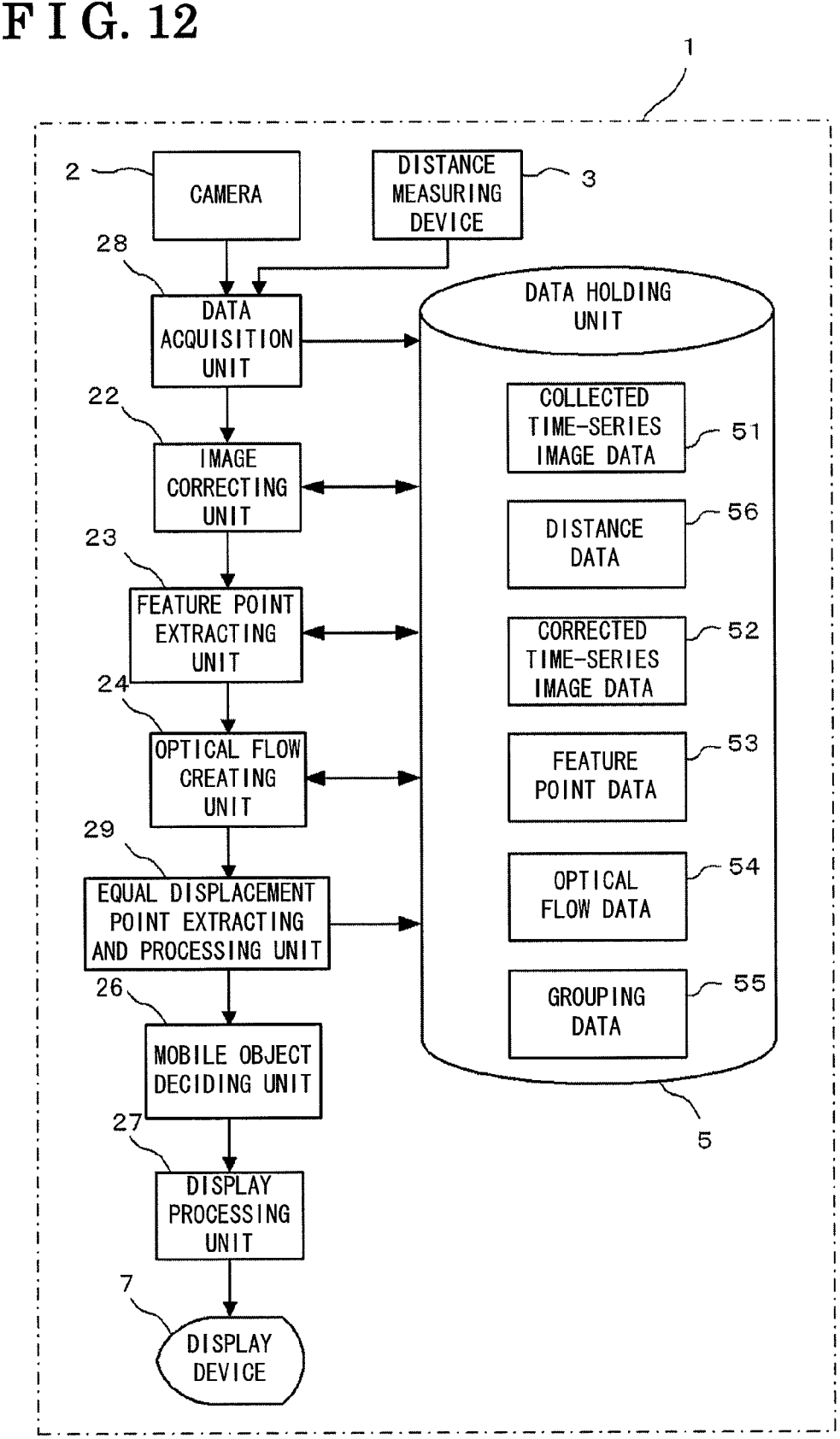
FIG. 12 is a block diagram showing a theoretical structure of the mobile object recognizing device according to a second embodiment.

(Second embodiment) Next, the mobile object recognizing device 1 will be described, where a coordinate of the feature point of the optical flow is calculated and the feature points whose displacements are equal between two images are grouped as the feature points that belong to one mobile object. FIG. 12 is a block diagram showing a theoretical structure of the mobile object recognizing device 1 according to the second embodiment of the present invention.

The mobile object recognizing device 1 is constituted by the camera 2, the distance measuring device 3, a data acquisition unit 28, the image correcting unit 22, the feature point extracting unit 23, the optical flow creating unit 24, an equal displacement point extracting and processing unit 29, the data holding unit 5, the mobile object deciding unit 26, the display processing unit 27, the display device 7 and so forth. The collected time-series image data 51, distance data 56, the corrected time-series image data 52, the feature point data 53, the optical flow data 54 and the grouping data 55 are stored and held in the data holding unit 5.

The camera 2, the image correcting unit 22, the feature point extracting unit 23, the optical flow creating unit 24, the mobile object deciding unit 26, the display processing unit 27 and the display device 7 are identical to those of the first embodiment.

The distance measuring device 3 corresponds to measuring equipment measuring a distance by using a physical method, including, for example, the millimeter wave radar, the laser range finder, the ultrasonic distance meter. The distance measuring device 3 measures the distance to the object positioned in a direction of which image is taken by the camera 2. The data acquisition unit 28 acquires the time-series image from the camera 2 and saves the image as the collected time-series image data 51 in the data holding unit 5. In addition, the data acquisition unit 28 acquires the data of the distance measuring device 3 and saves the data as the distance data 56 in the data holding unit 5.

The equal displacement point extracting and processing unit 29 calculates the displacement of the feature point in the optical flow based on the distance to the feature point and based on the optical flow including the feature point. In addition, the equal displacement point extracting and processing unit 29 groups the feature points having the same calculated displacements as the feature points belonging to one mobile object. Then, the equal displacement point extracting and processing unit 29 saves data of the grouped optical flows as the grouping data 55 in the data holding unit 5.

From the distance Z to the feature point corresponding to the end point of the optical flow, the world coordinate (X, Y) of the feature point is calculated by the following mathematical expression. Here, the distance Z is the direction cosine of the distance from the camera to the object with respect to the imaging direction. The imaging direction is the direction of the optical axis of the camera, which corresponds to the horizontal direction (parallel to the road surface) when the image is normalized in the horizontal direction. Hereinafter, the imaging direction corresponds to the horizontal direction (parallel to the road surface). The coordinate of the feature point on the image plane is (u, v), the world coordinate is (X, Y, Z) and the central coordinate of the image is (cu, cv). (Xnum, Ynum) is the world coordinate of a starting point of the optical flow. The value previously calculated may be applied as the world coordinate of the starting point.

[Mathematical expression 10]

$$X_{num} = (c_u - u)(r_{32}r_{23} - r_{22}r_{33})S_v Z + (c_v - v)(r_{12}r_{33} - r_{32}r_{13})S_u Z +$$
$$(r_{12}r_{13} - r_{22}r_{33})S_u S_v Z + (c_u - u)(r_{32}t_2 - r_{22}t_3)S_v +$$
$$(c_v - v)(r_{12}t_3 - r_{32}t_1)S_u + (r_{12}t_2 - r_{22}t_1)S_u S_v$$

$$X = \frac{X_{num}}{(c_u - u)(r_{31}r_{22} - r_{32}r_{21})S_v + (c_v - v)(r_{11}r_{32} - r_{12}r_{31})S_u + (r_{11}r_{22} - r_{12}r_{21})S_u S_v}$$

$$Y_{num} = (c_u - u)(r_{21}r_{33} - r_{31}r_{23})S_v Z + (c_v - v)(r_{31}r_{13} - r_{11}r_{33})S_u Z +$$
$$(r_{21}r_{13} - r_{11}r_{23})S_u S_v Z + (c_u - u)(r_{21}t_3 - r_{31}t_2)S_v +$$
$$(c_v - v)(r_{31}t_1 - r_{11}t_3)S_u + (r_{21}t_1 - r_{11}t_2)S_u S_v$$

$$Y = \frac{Y_{num}}{(c_u - u)(r_{31}r_{22} - r_{32}r_{21})S_v + (c_v - v)(r_{11}r_{32} - r_{12}r_{31})S_u + (r_{11}r_{22} - r_{12}r_{21})S_u S_v}$$

Here, Su and Sv are the scale factors, R=[rij] is the rotating matrix with the coefficient of the projective transformation matrix and T=[tk]$^T$ is the parallel motion vector with the coefficient of the projective transformation matrix. That is, when θ Pan, θ Tilt and θ Roll are mounting angles of the camera and $T_X$, $T_Y$ and $T_Z$ are mounting positions of the camera, the coefficient of the projective transformation matrix is expressed by the following mathematical expression:

$$\begin{pmatrix} r_{11} & r_{12} & r_{13} & t_1 \\ r_{21} & r_{22} & r_{23} & t_2 \\ r_{31} & r_{32} & r_{33} & t_3 \\ 0 & 0 & 0 & 1 \end{pmatrix} = \begin{pmatrix} \cos\theta_{Pan} & 0 & \sin\theta_{Pan} & 0 \\ 0 & 1 & 0 & 0 \\ -\sin\theta_{Pan} & 0 & \cos\theta_{Pan} & 0 \\ 0 & 0 & 0 & 1 \end{pmatrix}$$

$$\begin{pmatrix} 1 & 0 & 0 & 0 \\ 0 & \cos\theta_{Tilt} & -\sin\theta_{Tilt} & 0 \\ 0 & \sin\theta_{Tilt} & \cos\theta_{Tilt} & 0 \\ 0 & 0 & 0 & 1 \end{pmatrix} \begin{pmatrix} \cos\theta_{Roll} & -\sin\theta_{Roll} & 0 & 0 \\ \sin\theta_{Roll} & \cos\theta_{Roll} & 0 & 0 \\ 0 & 0 & 1 & 0 \\ 0 & 0 & 0 & 1 \end{pmatrix} \begin{pmatrix} 1 & 0 & 0 & T_X \\ 0 & 1 & 0 & T_Y \\ 0 & 0 & 1 & T_Z \\ 0 & 0 & 0 & 1 \end{pmatrix}$$

With regard to the distance Z to the end point, the previously calculated value is used as a Z coordinate of the starting point and the value calculated in the mathematical expression 9 with assumption that the lowest point of the optical flows is the road surface is used as a Z coordinate of an ending point. That is, the distance Z calculated in the first embodiment may be applied. In that case, the distance measuring device 3 does not have to be used.

By measuring the distance Z to each feature point and calculating the world coordinate of each feature point, the feature points whose displacements (vectors) in terms of the world coordinate system are equal are grouped as the feature points that belong to the one mobile object. For approximation purposes, distances Z to the feature points in an operation area may be represented by one value to calculate the world coordinate, considering the distances Z (direction cosine with respect to the imaging direction) to be the same. For approximation purposes, the grouping is performed, for example, as follows;

When the coordinates (X, Y) of the calculated end points are plotted on the plane so that the calculated end points serve as the starting points and the ending points of the vectors, FIG. 10 is obtained. The optical flows whose vectors have the identical direction and the length, that is, the optical flows whose displacements are equal to one another allowing the certain error are grouped as the feature points belonging to one mobile object. Based on the grouped optical flows, the decisions are made on the mobile body and a display processing is performed in the same manner as described in the first embodiment.

Figure 13:
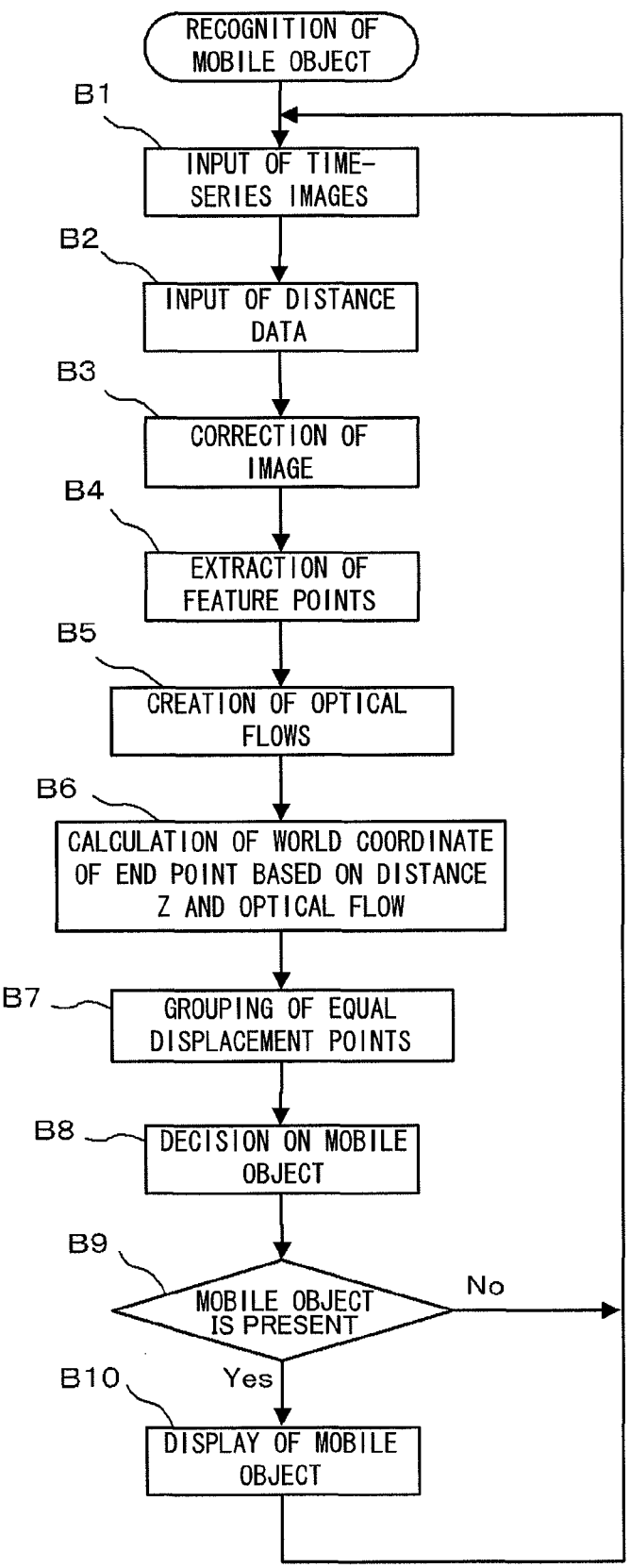
FIG. 13 is a flow chart showing an example of the operation of the recognition of the mobile object of the mobile object recognizing device according to the second embodiment.

Next, the operation of the mobile object recognizing device 1 will be described, where the coordinate of the feature point of the optical flow is calculated and the feature points whose displacements are equal between two images are grouped as the feature points that belong to one mobile object. A physical structure of the mobile object recognizing device 1 according to the second embodiment is shown in, for example, FIG. 2. FIG. 13 is a flow chart showing an example of the operation for recognizing the mobile object of the mobile object recognizing device 1 according to the second embodiment.

The images in time series are inputted to the control unit 11 from the camera 2 via the transmitting and receiving unit 16 (Step B1). The distance data 56 is inputted to the control unit 11 from the distance measuring device 3 (Step B2). When the distance Z takes the value calculated in the mathematical expression 9 with the assumption that the lowest point of the optical flows is the road surface, the previous value is applied. As previously described, the control unit 11 corrects the image in accordance with the characteristics of the lens of the camera 2 (Step B3). Further, the image may be normalized in the horizontal direction by correcting the tilt angle of the camera 2.

The control unit 11 extracts the feature points of the corrected image by, for example, the previously-described KLT feature point extraction method (Step B4). The control unit 11 compares the extracted feature points between the images in time series and creates the optical flow by applying the previously-described template matching (Step B5).

Next, the world coordinate of the feature point is calculated based on the optical flow and the distance Z (Step B6). When the distance Z takes the value calculated in the mathematical expression 9 with the assumption that the lowest point of the optical flows is the road surface, the distance Z is calculated from the optical flow of the feature point that was the lowest point in the previous case. Then, points with equal displacement are grouped (Step B7). As previously described, among the vectors plotted as in FIG. 10, the vectors having the same directions and sizes allowing the certain error are grouped as the optical flows that belong to one and the same mobile object.

The mobile object is decided based on the patterns of the feature points belonging to the grouped optical flows (Step B8). Further, the distance to the mobile object may be calculated in the manner shown in the mathematical expression 9 with the assumption that the lowest point of the optical flows is the road surface (the same plane as the one on which the own vehicle is positioned).

When the mobile object is recognized (Yes in Step B9), the control unit 11 causes the information to be displayed on the display device 7 via the screen display unit 15 (Step B10). For example, the relationship between the position of the vehicle approaching from behind and that of the own vehicle is shown in the plan view. Alternatively, the display device 7 may notify the driver by means of the acoustic effects such as the sound or the chime. Then, the operation returns to the input of the images in time series (Step B1) and the recognition of the mobile object is repeated. When no mobile object is recognized (No in Step B9), no display takes place and the recognition of the mobile object is repeated (Step B1).

According to the mobile object recognizing device 1 of the present invention, the optical flows created from the series-image data are correctly grouped for each mobile object. As a result, the mobile object is correctly recognized. In addition, the mobile object recognizing device 1 corrects the image in accordance with the characteristics of the lens of the camera 2, thereby the optical flows created from the corrected image data are correctly grouped for each mobile object even when the rear camera employing the wide-range lens is used.

The previously described structure of the hardware and flow charts are examples and may be arbitrarily modified and revised.

A leading part of the mobile object recognizing device 1 which is constituted by the control unit 11, the main memory unit 12, the external memory unit 13, the operating unit 14, the screen display unit 15, the transmitting and receiving unit 16, the internal bus 10 and so forth and which performs the processing of the mobile object recognizing device 1 may be achieved by use of a conventional computer system instead of a dedicated system. For example, the mobile object recognizing device 1 executing the previously-described processing may be so structured that the computer programs for executing the previously-described operations are stored in a memory medium readable by the computer (a flexible disc, CD-ROM, DVD-Rom or the like) and provided, and then installed on the computer. Alternatively, the mobile object recognizing device 1 may be so structured that the computer programs are stored in a memory device provided in a server device on a communication network including the Internet, and, for example, downloaded by the conventional computer system.

Still alternatively, in case that the mobile object recognizing device 1 causes the functions thereof to be shared between an OS (operating system) and an application program, or to be cooperated by the OS and the application program, only the application program part may be stored in the memory medium or the memory device.

Still alternatively, the computer program may be superimposed on a carrier wave and distributed via the communication network. For example, the previously-described computer program may be posted on a bulletin board on the communication network (BBS, Bulletin Board System) and distributed via the network. Then, the structure may be available where the computer program is run and executed like other application programs under control of the OS, thereby performing the previously-described processing.

The embodiments disclosed this time should be regarded as exemplifications in every aspect and should not be construed in a limited manner. It is intended that the present invention should be indicated by the scope of claims and not by the above-described explanation, and that all the modifications are included within the scope of claims, and within a meaning and a range of equivalence.

The present application is based on Japanese patent application No. 2006-275387 filed on Oct. 6, 2006. The whole of the specification, the scope of claims for patent application, and the drawings of the Japanese patent application No. 2006-27538 is included in the present specification as reference.

INDUSTRIAL APPLICABILITY

The present invention is applicable to a mobile object recognizing device for correctly grouping optical flows of feature points extracted from images in time series for each mobile object and detecting the mobile object.

The invention claimed is:

1. A mobile object recognizing device comprising;
an image-taking unit that is mounted on a vehicle and takes images in time series;
a feature point extracting means extracting a feature point of each image taken in time series by the image-taking unit;
an optical flow creating unit that creates optical flows corresponding to a vector formed by connecting one feature point in one image with another feature point in another image, the connected two feature points being identified to have the same pattern by comparing the feature points with one another between different images; and
a grouping means selecting and grouping the optical flows created by the optical flow creating unit which belong to a particular mobile object,
wherein each of the selected optical flows is defined as having an extended line intersecting at one focus of expansion within a predetermined error range, and having an equal external ratio of each line segment connecting one of the end points of the optical flow and the focus of expansion within a predetermined error range when the other one of the end points of the optical flow is an externally dividing point on the extended line.

2. The mobile object recognizing device according to claim 1, further comprising:
an image correcting means correcting the image taken by the image-taking unit in accordance with characteristics of a lens of the image-taking unit to obtain a perspective image, wherein the feature point extracting means extracts the feature point of the image corrected by the image correcting means.

3. The mobile object recognizing device according to claim 1, further comprising:
a distance calculating means calculating a distance from the image-taking unit to the mobile object by using the optical flows grouped by the grouping means.

4. A mobile object recognizing device comprising:
an image-taking unit that is mounted on a vehicle and takes images in time series;
a feature point extracting means extracting a feature point of each image taken in time series by the image-taking unit;
an optical flow creating unit that creates optical flows corresponding to a vector formed by connecting one feature point in one image with another feature point in another image, the connected two feature points being identified to have the same pattern by comparing the feature points with one another between different images;
a distance detecting means detecting a distance from the image-taking unit to at least one feature point extracted by the feature point extracting means;
a displacement calculating means calculating a displacement of the feature point in each optical flow based on the distance to the feature point detected by the distance detecting means and the optical flow including the feature point;
an equal displacement point selecting means selecting the feature points having an equal displacement calculated by the displacement calculating means as the feature points belonging to one mobile object;
a grouping means selecting and grouping the optical flows created by the optical flow creating unit which belong to a particular mobile object, wherein each of the selected optical flows is defined as having an extended line intersecting at one focus of expansion within a predetermined error range, and having an equal external ratio of each line segment connecting one of the end points of the optical flow and the focus of expansion within a predetermined error range when the other one of the end points of the optical flow is an externally dividing point on the extended line; and a distance calculating means calculating a distance from the image-taking unit to the mobile object by using the optical flows grouped by the grouping means, wherein the distance calculated by the distance calculating means is the distance to the feature point.

5. The mobile object recognizing device according to claim further comprising an image correcting means correcting the image taken by the image-taking unit in accordance with characteristics of a lens of the image-taking unit to obtain a perspective image, wherein the feature point extracting means extracts the feature point of the image corrected by the image correcting means.

6. The mobile object recognizing device according to claim 4, wherein the distance detecting means measures the distance to the mobile object by a physical means.

7. A mobile object recognizing method comprising:

an image-taking step inputting images in time series;

a feature point extracting step extracting feature point of each image inputted in time series in the image-taking step;

an optical flow creating step creating optical flows corresponding to a vector formed by connecting one feature point in one image with another feature point in another image, the connected two feature points being identified to have the same pattern by comparing the feature points with one another between different images; and a grouping step selecting and grouping the optical flows, wherein each of the selected optical flows is defined as having an extended line intersecting at one focus of expansion within a predetermined error range, and having an equal external ratio of each line segment connecting one of the end points of the optical flow and the focus of expansion within a predetermined error range when the other one of the end points of the optical flow is an externally dividing point on the extended line.

8. The mobile object recognizing method according to claim 7, further comprising:

an image correcting step correcting the image inputted in the image-taking step in accordance with characteristics of a lens of the image-taking unit to obtain a perspective image, wherein the feature point extracting step extracts the feature point of the image corrected in the image correcting step.

9. A non-transitory computer-readable medium causing a computer to function as:

an image-inputting means inputting images in time series from an image-taking unit;

a feature point extracting means extracting a plurality of feature points of each image taken in time series by the image-inputting means;

an optical flow creating unit that creates optical flows corresponding to a vector formed by connecting one feature point in one image with another feature point in another image, the connected two feature points being identified to change positions thereof on the image and have the same pattern by comparing the feature points with one another between different images; and a grouping means selecting and grouping the optical flows created by the optical flow creating unit which belong to a particular mobile object, wherein each of the selected optical flows is defined as having an extended line intersecting at one focus of expansion within a predetermined error range, and having an equal external ratio of each line segment connecting one of the end points of the optical flow and the focus of expansion within a predetermined error range when the other one of the end points of the optical flow is an externally dividing point on the extended line.

* * * * *